Feb. 20, 1934.　　　A. CHEVILLOT　　　1,947,696
FLUID PRESSURE BRAKE
Filed May 27, 1931
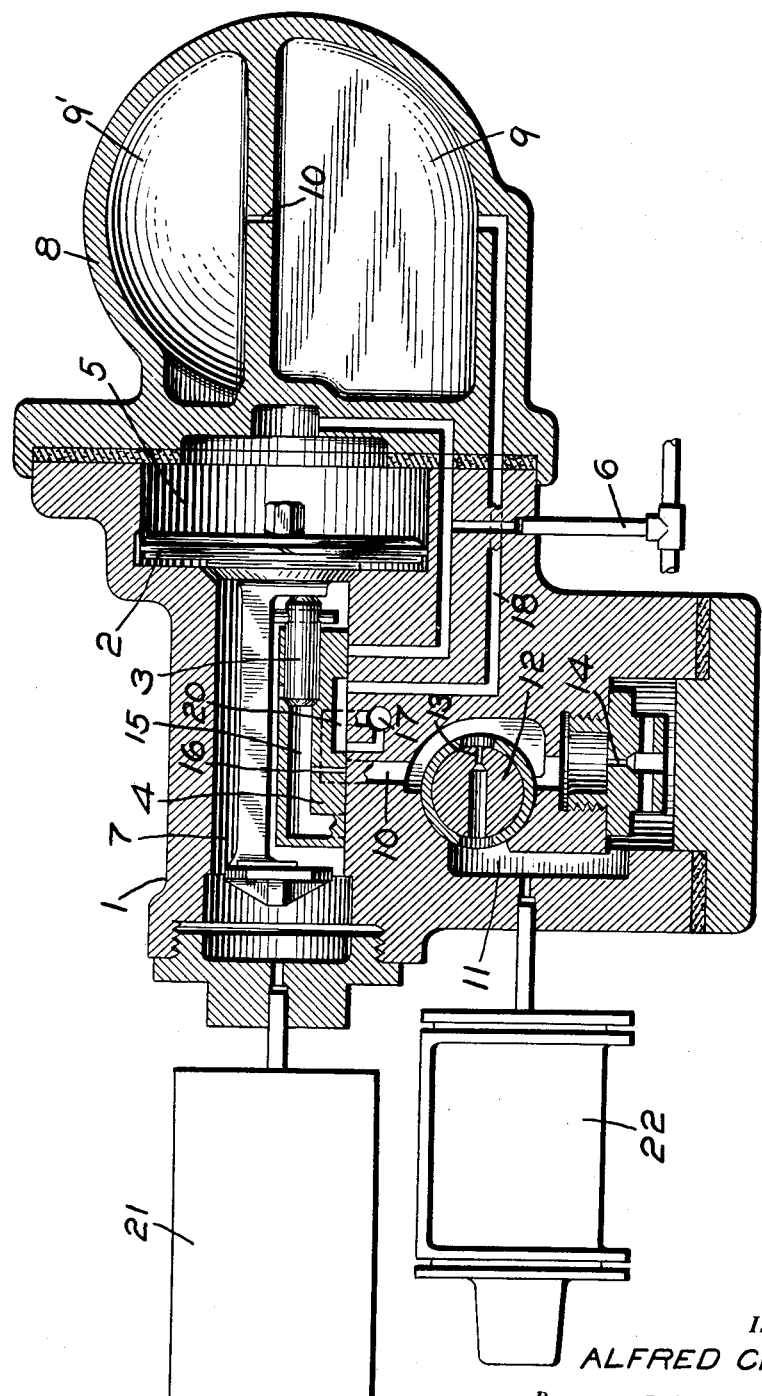
INVENTOR.
ALFRED CHEVILLOT
By　*Wm. M. Cady*
ATTORNEY.

Patented Feb. 20, 1934

1,947,696

UNITED STATES PATENT OFFICE 1,947,696

FLUID PRESSURE BRAKE

Alfred Chevillot, Gargan Livry, Seine et Oise, France, assignor to The Westinghouse Air Brake Company, Wilmerding, Pa., a corporation of Pennsylvania Application May 27, 1931, Serial No. 540,248, and in France September 11, 1930

3 Claims. (Cl. 303—41)

This invention relates to fluid pressure braking apparatus of the kind comprising a triple or distributing valve device adapted to control the supply of fluid under pressure to and its release from the brake cylinders of the apparatus in response to variations in train pipe pressure.

In braking systems of the general character referred to above, the triple or distributing valve device more particularly as installed on locomotives and tenders, may be provided with a change-over cock for regulating the rate of supply of fluid under pressure to the brake cylinder or cylinders in accordance with the type of train to be braked (i. e.) a passenger or a freight train, whilst not comprising a quick-inshot or minimum pressure valve device. As a consequence, the rate of supply of fluid under pressure to the brake cylinder under freight conditions may be so slow that the brake cylinder piston may not be moved owing to the fluid flowing, at substantially the same rate as it is supplied through the change-over cock to the brake cylinder, through the leakage groove, which is provided in the brake cylinder around the brake cylinder piston in order to assure that an application of the brakes will not be effected owing to leakage of fluid at a relatively slow rate from the train pipe.

In accordance with the present invention, however, the leakage groove hereinbefore referred to is dispensed with, and, in order to avoid an undesired gradual application of the brakes owing to the gradual accumulation of fluid under pressure in the brake cylinder as a result of leakage at a slow rate from the train pipe, the piston of the distributing valve device is arranged to be returned to its release position before it attains its application position whenever it moves towards its application position at a rate less than a predetermined relatively slow rate, owing for instance to leakage of fluid from the train pipe. To this end the auxiliary reservoir or other chamber, the pressure in which in opposition to the train pipe pressure is arranged to control the operation of the distributing valve device, may be arranged to be connected through a restricted port with an atmospheric outlet when the piston and slide valve of the distributing valve device reach a predetermined position intermediate the release and application positions so that, should the said piston and slide valve be moving at a relatively slow rate towards its application position owing to the leakage of fluid from the train pipe, sufficient fluid will be vented through the restricted port to the atmosphere from the reservoir or chamber in this intermediate position to enable the train pipe pressure to return the piston of the distributing valve device to its release position and thus avoid an application of the brakes. The restricted port hereinbefore referred to may be provided in the slide valve of a triple valve device and arranged to cooperate with the atmospheric exhaust port, to which the bulb or accelerating chamber is connected under release conditions, so as to connect the graduating valve chamber in the slide valve to the atmosphere in the intermediate position of the slide valve referred to hereinbefore.

In order that the invention may be readily understood, it will now be described by way of example, with reference to the accompanying drawing, the single figure of which is a view illustrating the invention as applied to a known form of triple valve device for locomotives and tenders.

Referring now to the drawing, the triple valve device comprises a body portion 1 containing a piston 2 carrying a graduating valve 3 and arranged to cooperate with a main slide valve 4, the piston 2 being located in a chamber 5 in permanent communication with the train pipe 6 and the slide valve 4 being located in a chamber 7 in permanent communication with the auxiliary reservoir 21.

In a body portion 8 bolted to the body portion 1 two accelerating chambers 9 and 9' in communication with one another through a restricted port 10 are provided.

Interposed between the brake cylinder supply passages 10 and 11 is a change-over cock 12 having a restricted port 13 therein which is arranged to connect the passages 10 and 11 while by-passing the permanently open restricted port 14 connecting the said passages when, as shown, the cock 12 is in its "passenger" position, communication between the passages 10 and 11 being arranged to be permitted only through the port 14 when the cock 12 is in its "freight" position.

When the train pipe pressure and consequently the fluid pressure obtaining in the chamber 5 is reduced in order to effect an application of the brakes, auxiliary reservoir pressure acting on the left side of the piston 2 in the chamber 7 moves the said piston relatively rapidly towards the right so as first to open the graduating valve 3 and then move the slide valve 4 towards the right until the graduating valve chamber is placed in communication with the brake cylinder supply passage 10. Fluid under pressure is then supplied from the auxiliary reservoir to the brake cylinder through the slide valve chamber 7, the graduating valve chamber 15, the passage 10, the restricted port 14 and passage 11, it being assumed that the cock 12 is in its "freight" position in which the restricted port 13 is closed.

Now should the brake cylinder have a leakage groove around the brake cylinder piston for the purpose hereinbefore set forth, the said piston may fail to be moved so as to apply the brakes owing to the fluid flowing through the leakage groove at substantially the same rate as it is supplied through the restricted port 14.

The leakage groove around the brake cylinder piston is therefore omitted and in order to prevent the brakes creeping on owing to gradual leakage of fluid under pressre from the train pipe and chamber 5 of the triple valve device, a restricted port 16 is provided in the slide valve 4, this restricted port being so arranged that when the slide valve 4 is in a position intermediate the release and application positions, it connects the graduating valve chamber 15 with the atmospheric exhaust port 17 to which the accelerating chambers 9 and 9' are arranged to be connected in the release position of the slide valve 4, through passage 18, a port 19 in the slide valve seat and a cavity 20 in the slide valve.

Accordingly, should there be a gradual leakage of fluid from the train pipe 6 and chamber 5, the auxiliary reservoir pressure acting on the left side of the piston 2 in the chamber 7 will cause the piston 2 to move towards the right relatively slowly, (i. e.) more slowly than if a service reduction in train pipe pressure had been effected in order to apply the brakes. The graduating valve 3 is thus opened and then the slide valve 4 moved relatively slowly towards the right, but before the said slide valve attains its application position, the restricted port 16 therein registers with atmospheric exhaust port 17 and, owing to the relatively slow movement of the slide valve 4, sufficient fluid is vented from the auxiliary reservoir through the chambers 7 and 15, restricted port 16 and atmospheric port 17 to enable the train pipe pressure obtaining in the chamber 5 to move the piston 2, graduating valve 3, and slide valve 4 rapidly back to their release positions as illustrated in the drawing, thus avoiding an undesired creeping on of the brakes.

When a service reduction in train pipe pressure is effected in order to apply the brakes, the difference in pressure of the fluid at opposite sides of the piston 2 being greater than in the case of leakage only from the train pipe, the piston and associated valves are moved relatively rapidly to their application positions and the restricted port 16 moves into and then out of registry with the atmospheric exhaust outlet 17 so rapidly that substantially no loss of fluid from the auxiliary reservoir occurs.

It will be evident that the invention is not limited to the particular construction and arrangement of parts hereinbefore described which may be varied as desired to suit particular requirements without exceeding the scope of the invention.

Having now described my invention, what I claim as new and desire to secure by Letters Patent, is:

1. In a fluid pressure brake, the combination with a brake pipe, auxiliary reservoir and brake cylinder, of a brake controlling valve device comprising a piston subject to the opposing pressures of the brake pipe and auxiliary reservoir and valve means having a normal position and operated by said piston upon a reduction in brake pipe pressure for supplying fluid under pressure to the brake cylinder to effect an application of the brakes, and means for venting fluid under pressure at a rate less than the service rate of reduction in brake pipe pressure from the auxiliary reservoir to the atmosphere in a position of said valve means intermediate the normal position and the brake applying position to prevent movement of said valve means to the brake applying position at any time that the rate of reduction in brake pipe pressure does not equal the service rate.

2. In a fluid pressure brake, the combination with a brake pipe, auxiliary reservoir and brake cylinder, of a brake controlling valve device comprising a piston subject to the opposing pressures of the brake pipe and auxiliary reservoir and valve means having a normal position and operated by said piston upon a reduction in brake pipe pressure for supplying fluid under pressure to the brake cylinder to effect an application of the brakes, and means for venting fluid under pressure at less than the service rate from the auxiliary reservoir to the atmosphere in a position of said valve means intermediate the normal position and the brake applying position to prevent movement of said valve means to the brake applying position at any time so long as the rate of reduction in brake pipe pressure is less than the service rate.

3. In a fluid pressure brake, the combination with a brake pipe, auxiliary reservoir, and brake cylinder, of a brake controlling valve device comprising a piston subject to the opposing pressures of the brake pipe and the auxiliary reservoir and valve means having a normal position and operated by said piston upon a reduction in brake pipe pressure for supplying fluid under pressure to the brake cylinder to effect an application of the brakes, and means for venting fluid from the auxiliary reservoir upon movement of said valve means to a position intermediate said normal position and the brake applying position, through a restricted communication at a rate less than the service rate of reduction in brake pipe pressure so as to prevent movement of the piston to brake application position at any time by thus reducing the auxiliary reservoir pressure, unless the rate of reduction in brake pipe pressure exceeds the rate at which the auxiliary reservoir pressure is being reduced.

A. CHEVILLOT.